Dec. 30, 1969  TOSHIO TANAKA  3,486,600
METHOD OF AUTOMATICALLY EXAMINING RAILWAY TICKETS
Filed Jan. 5, 1968  2 Sheets-Sheet 1

TOSHIO TANAKA
INVENTOR

BY Christensen,
Sanborn & Matthews
ATTORNEY

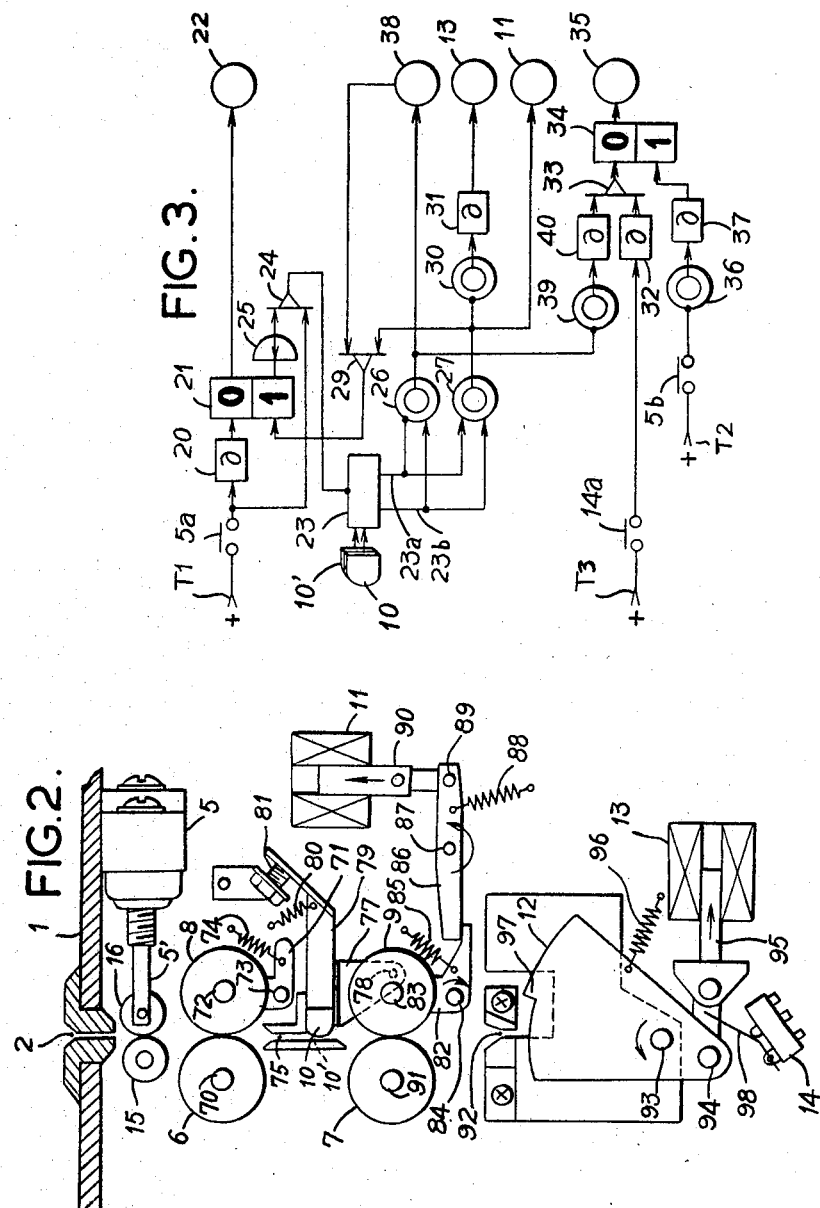

United States Patent Office 3,486,600
Patented Dec. 30, 1969

3,486,600
METHOD OF AUTOMATICALLY EXAMINING RAILWAY TICKETS
Toshio Tanaka, 927 Fukakusa Minami Hasuike-cho, Fushimi-ku, Kyoto, Japan
Filed Jan. 5, 1968, Ser. No. 696,022
Claims priority, application Japan, Jan. 10, 1967, 42/1,890; June 24, 1967, 42/40,651
Int. Cl. G07f 7/00
U.S. Cl. 194—4       10 Claims

ABSTRACT OF THE DISCLOSURE

In a transportation system having a plurality of stations, a ticket operated gate control is provided wherein the same ticket is utilized for operating an entrance gate and an exit gate. Validity indicia on the ticket are monitored at both the entrance and the exit gates. A portion of these indicia are altered upon insertion of the ticket into the entrance gate so that it cannot again be used to operate an entrance gate, but another portion remains unaltered, enabling the ticket to be used for controlling an exit gate responsive to the same validity indicia. The control means in the gates are of the type which draw the ticket into a slot and indicia thereon are read sequentially by appropriately positioned reading heads. The entrance gate heads are positioned in alignment with ticket altering means therein so that once the ticket has been altered by an entrance gate, no other entrance gate will accept the ticket as valid, whereas the reading heads in the exit gates are positioned differently to read unaltered indicia on the ticket.

BACKGROUND AND SUMMARY OF THE INVENTION

This invention relates to a method of automatically examining railway tickets.

There is known an automatic railway ticket examining system in which a ticket that has once been used is not allowed to be used again. In such a system, when a ticket is used at a ticket gate, it is necessary to test whether the ticket is a new or a used one. To enable such a test, the ticket that has been used at a ticket gate may be provided with an additional information to that effect, so that should the ticket be used again the added information may be detected, by which to recognize that the ticket is a used one. For such an added information, the used ticket may be punched or stamped. However, each ticket gate would have to be provided with means for detecting such added information in addition to the means for reading the information the ticket has such as the period of availability and range of journey, etc. This would result in complication of the construction of the ticket gate, an increase in its manufacturing cost and reduction of passage efficiency through the gate.

Accordingly, the primary object of the invention is to provide a method of automatically examining tickets, wherein the information added to the ticket that has once been used and showing that the ticket is a used one is such that no specific additional means need be provided to detect or read the added information when the ticket is used again for entrance.

In known automatic ticket examining systems the tickets generally have information such as this period of availability and the range of journey recorded thereon. The information is recorded in the form of suitable marks arranged in accordance with a predetermined code which are magnetically, optically or electrically detectable. In addition to these code marks, a plurality of synchronizing marks are also given on the ticket to help read the code marks. In accordance with the present invention, to give the ticket that has once been used the additional information that the ticket is now a used one is to disturb or change the original arrangement of the marks. For example, one or more of the marks may be removed from the ticket by cutting part of the ticket, or two or more of the marks may be combined into a single larger mark by painting the space therebetween with a suitable ink or the like. When the ticket that has thus been treated is again used at a ticket gate for entrance, a ticket reader provided in the ticket gate can no longer recognize the ticket as a valid one due to the disturbed arrangement of the code marks thereon, so that passage through the gate is prevented. Thus, in accordance with the present invention, the existing ticket reader suffices to read the added information, that is, to detect whether it is a new or a used ticket, and no particular device for that purpose need be provided.

The arrangement, however, poses a new problem which must be solved. Once a ticket has been used for entrance, the original arrangement of the marks on the ticket is changed according to the invention. When this ticket is used again for exit at a destination or for a stop-over and not for entrance, however, the original information thereon must be read to see whether the ticket is properly used. Therefore, the above-mentioned changing of the original arrangement of the marks on the ticket at an entrance gate must be such as not to prevent reading of the ticket information at an exit gate.

Accordingly, another object of the invention is to provide a method of automatically examining tickets, wherein when a ticket has been used for entrance, the original arrangement of the marks on the ticket is changed or disturbed to give the ticket the additional information that the ticket now is a used one, and wherein the changing or disturbing of the arrangement of the bark is effected in such a manner as to enable reading of the original ticket information at an exit gate despite the changing or disturbance.

The above and other objects of the invention will become apparent from the following detailed description of preferred embodiments thereof with reference to the accompanying drawings, wherein:

FIG. 2 shows a mechanism contained in the ticket gate of FIG. 1 when used as an entrance gate;

FIG. 3 is a block diagram of an electrical control circuit used in the invention.

Figure 1:
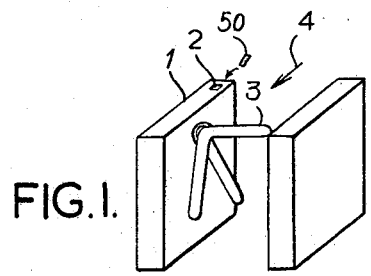
FIG. 1 is a schematic perspective view of a ticket gate used in the method of the invention.

There is shown in FIG. 1 a ticket gate 1 installed to define a gateway to the platform of a station. The gate has a turnstile 3 to normally close the gateway. At least two such gates are installed at a station, one for entrance and the other for exit. Passengers are supposed to pass through the gate in the direction of an arrow 4. As they pass through the gate, they insert a ticket 50 into a slot 2 formed in the top wall of one side structure of the gate. The ticket is then drawn inside the slot and the information of the ticket is read, as will be described in detail later. If the information has been recognized as valid, a locking mechanism for the turnstile 3 may be released to enable opening of the gate. If the gate is for entrance, the ticket then has its original arrangement of the information and/or synchronizing marks disturbed or changed into an invalid arrangement and then is sent out of the slot 2 again. If the information on the ticket has been recognized as invalid, the gate is kept closed.

If the gate is for exit for stop-over, the ticket is returned to its owner with or without changing the original arrangement of the marks.

If the gate is for exit at a destination, the ticket is collected inside the gate so as not to be returned to its owner.

The turnstile 3 may be replaced by a bar or any other suitable member, and an alarm buzzer and/or lamp may be employed in place of, or in addition to, the turnstile or the bar.

Figure 4A:
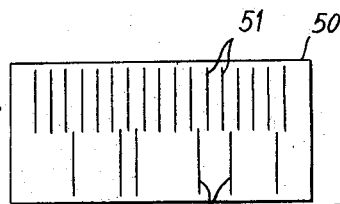
FIGS. 4a–4e show various tickets used in the invention.

As shown in detail in FIG. 4a, the ticket 50 is provided with a plurality of marks in the form of bars printed thereon with an ink containing powdered magnetic material or pigment. The marks may be in the form of punched holes or slits. In the case of magnetic inked marks, the code reader may be a magnetic reading head; in the case of colored marks, the reader may comprise a light source and an element sensitive to the light reflected by the colored marks; and in the case of punched holes or slits, the reader may comprise a light source and an element sensitive to the light passing through the holes or slits.

The ticket 50 shown in FIGS. 4a–4d have two rows of bars 51 and 52. The bars 52 are code marks expressing a predetermined information, such as the period of availability of the ticket and the range of journey the owner of the ticket is entitled to, and the bars 51 are synchronizing marks to provide timing for reading of the code marks. The ticket is moved along its length, say, rightward in FIGS. 4a–4d in order to have its marks read by the reading heads to be described later. The bars 51 and 52 are arranged in spaced apart relation along the length of the ticket at opposite sides of the center line thereof. They extend transversely of the length of the ticket, the bars 51 substantially across one-half of the width of the ticket and the bars 52 additionally across the other half of the width thereof.

Turning to FIGS. 2 and 3, just inside the slot 2 there are provided a pair of rollers 15 and 16 in frictional contact with each other. The roller 16 is mounted on a rod 5' adapted to act on a limit-switch 5. The ticket 50 that has been inserted into the slot 2 has its lower end nipped between the rollers 15 and 16, whereupon the roller 16 is pushed apart from the roller 15 so that the rod 5' is moved lengthwise rightward in the figure. This causes the switch 5 to close its normally open contact 5a (FIG. 3) connected between a source terminal T1 and a differentiator 20. The closing of the switch contact 5a results in application of a signal at the terminal T1 to the differentiator 20, the output pulse from which sets a flip-flop 21. The set output from the flip-flop 21 energizes an electromagnetic clutch 22, not shown in FIG. 2, for forward or clockwise rotation of the roller 6.

The signal at the terminal T1 is also applied as one input to an OR element 24, the output from which is applied as an inhibit input to a collation circuit 23, in which the information that has been read from the inserted ticket is collated with the valid information memorized in the circuit 23 before hand. So long as the inhibit input is being applied to the circuit 23, it does not operate and no collation is conducted. The OR element 24 receives as another input the output from the flip-flop 21 through an off-delay element 25.

When the clutch 22 has been energized by the set output from the flip-flop 21, it establishes a drive connection between a motor, not shown, and shafts 70 and 91 to rotate the two shafts clockwise, on which the rollers 6 and 7 are respectively mounted for rotation therewith. In frictional contact with the roller 6, roller 8 is mounted on a shaft 72. The shaft 72 is rotatably mounted on a lever 71 pivoted on a pin 73 and biased counter-clockwise by a spring 74. In frictional contact with the roller 7 a roller 9 is mounted on a shaft 83.

The ticket that has passed through the rollers 15 and 16 is nipped by the rollers 6 and 8, and as the rollers are rotated, the ticket is pulled downward through a guide channel 75 until it is nipped by the rollers 7 and 9 to be further pulled downward. Inside the channel, there are provided a pair of reading heads 10 and 10' for scanning the surface of the ticket as it passes by. The heads 10 and 10' are arranged transversely of the direction of movement of the ticket so that the head 10 detects the information code bars 52 on the ticket and the other head 10' detects the synchronizing bars 51 thereon. More strictly speaking, at one side of the center line of the ticket, each bar 51 has one-half of its length lying across an area 101 (FIG. 4b) elongated along the length of the ticket and the other half across a similar elongated area 103 (FIG. 4d) running parallel with and alongside the area 101; and at the opposite side of the center line of the ticket, each bar 52 has one-half of its length lying across an elongated area 100 (FIG. 4b) and the other half across a similar elongated area 102 (FIG. 4d). The heads 10 and 10' are so positioned as to scan the elongated area 100 and 101 on the ticket, respectively, as the ticket is moved downward in the above-mentioned manner.

The heads 10 and 10' are mounted on a support 77 pivotable about a pin 78 and having a horizontal arm 79 biased by a spring 80 counter-clockwise as far as the arm 79 abuts against a stopper screw 81. The pressure the heads 10 and 10' exert on the face of a ticket passing through the channel 75 can be varied by regulating the stopper screw 81. The outputs from the reading heads 10 and 10' are applied to the collation circuit 23 (FIG. 3).

The shaft 83 of the roller 9 is mounted on a lever 82 pivotable about a pin 84 and biased by a spring 85 counter-clockwise as far as one end of the lever 82 is stopped by one end of a stopper lever 86. The lever 86 is pivotable about a pin 87 and biased by a spring 88 clockwise. This lever 86 has its opposite end connected by a pin 89 to a plunger rod 90 of a solenoid 11. When the solenoid 11 is energized, the plunger rod 90 is pulled upward to tilt the lever 86 leftward against the force of the spring 88. When the solenoid 11 is deenergized, the plunger 90 is pulled downward by the spring 88.

The information that has been read by the head 10 is collated with the valid information memorized in the circuit 23 beforehand. If the information is recognized as valid, the circuit 23 produces an output on a line 23a. When the collation has been finished, the circuit 23 produces an output on a line 23b, no matter whether the ticket has been recognized as valid or not. The contact 5a, when closed by insertion of a ticket into the slot 2, is kept closed so that the inhibit signal to the circuit 23 is retained until the ticket passes through between the rollers 15 and 16. The delay time provided by the element 25 is set so that the other input to the OR element 24 and, consequently, the inhibit signal to the circuit 23 disappear for commencement of collation in the circuit 23 a predetermined period of time after the ticket has left the rollers 15 and 16. The distance from the rollers 15, 16 to the heads 10, 10' is such that the first of the bars on the ticket is detected by the head 10 or 10' after the ticket has left the rollers 15 and 16. Thus, when the first bar on the ticket has been detected by the head 10 or 10', the inhibit signal on the circuit 23 has already been removed, so that the circuit 23 begins the collating operation as it receives the signals from the heads.

The output on the line 23a from the circuit 23 is applied as an inhibit signal to an INHIBIT element 26 on the one hand and as one input to an AND element 27 on the other hand. The output on the line 23b is applied as an input to the INHIBIT element 26 and also as the other input to the AND element 27. As previously mentioned, when the ticket inserted is recognized as valid, an output appears on the line 23a and when the collation has been finished, an output appears on the line 23b. As a result, the INHIBIT element 26 produces no output but the AND element 27 produces an output. If the inserted ticket is invalid, however, upon completion of the collation the INHIBIT element 26 produces an output whereas the AND element 27 does not.

The output from the INHIBIT element 26 actuates an alarm 38 and at the same time is applied to a NOT element 39. The device 38 may be a buzzer or lamp and at the same time includes a locking mechanism for the turnstile 3 of the gate. When the device 38 is operated, it produces a signal to be applied as a reset input to the flip-flop 21 through an OR element 29. Upon resetting of the flip-flop 21, the clutch 22 is deenergized so that the ticket is not pulled downward any further but stopped there. At the same time, the reset output from the flip-flop 21 is applied as an inhibit input to the circuit 23 through the off-delay element 25 and the OR element 24 as previously mentioned, whereupon the output from the INHIBIT element 26 is again removed. As a result, the NOT element 39 produces an output to be applied to a differentiator 40. The output pulse from the differentiator is applied as a set input to a flip-flop 34 through an OR element 33. The set output from the flip-flop 34 energizes a clutch 35 for reverse rotation of the motor, so that the rollers 6 and 7 are rotated counter-clockwise. This causes the ticket to be pushed upward from the position at which it has been held, so as to be returned to the owner out of the slot 2. During this course of upward movement, the ticket again passes between the rollers 15 and 16, thereby moving the roller 16 and its mounting rod 5′ to actuate the switch 5 to close its contacts 5a and 5b. When the ticket has been pulled out of the slot 2, the switch 5 is restored to open its contacts 5a and 5b. Despite the closing and opening of the switch contacts, however, the circuit 23 is kept inoperative because the output from the device 38 keeps the flip-flop 21 at a reset condition.

Upon opening of the contact 5b, the input being applied to a NOT element 36 from a terminal 72 disappears so that the NOT element 36 produces an output, which is applied to a differentiator 37. The output pulse from the differentiator 37 resets the flip-flop 34, thereby deenergizing the clutch 35. The device 38 may be manually or automatically rendered inoperative.

When the inserted ticket has been recognized as valid, the AND element 27 produces an output as previously mentioned. This output is applied as an input to the OR element 29 and the NOT element 30, and also energizes the solenoid 11. The output from the OR element 29 resets the flip-flop 21 thereby to apply an inhibit signal to the circuit 23 and at the same time cause the clutch 22 to be deenergized so as to stop the downward movement of the inserted ticket, just as in the case of an invalid ticket.

When the solenoid 11 is energized by the output from the AND element 27, the plunger 90 is pulled upward to tilt the lever 86 leftward on the pin 87. As the lever 87 is thus tilted, it turns the support lever 82 clockwise about the pin 84 so that the roller 9 is moved away from the opposite roller 7 it has been in contact with. This causes the ticket held between the rollers 7 and 9 to drop as far as the lower end of the ticket is held inside a slot 92. A cutter 12 is provided just below the slot 92. The cutter is biased clockwise by a spring 96 but is rotatable counter-clockwise about a pin 93 by means of a plunger 95 connected by a pin 94 to the lower end of the cutter.

When, upon resetting of the flip-flop 21, an inhibit signal has been applied to the collation circuit 23, the output from the AND element 27 disappears so that the NOT element 30 produces an output, which energizes a solenoid 13 through a differentiator 31, whereupon the solenoid 13 pulls in the plunger rod 95 so as to turn the cutter 21 counter-clockwise about the pin 93, thereby cutting a part of the lower end of the ticket with a blade 97. During the counter-clockwise movement of the cutter 12, a lever 98 is contacted by a projection on the plunger 95 to actuate a switch 14 to close its contact 14a, whereupon a signal at a terminal T3 is applied to a differentiator 32, the output from which sets the flip-flop 34 through the OR element 33. When the flip-flop 34 has been set, the ticket is pulled upward again to be returned to its owner, as previously mentioned. When the ticket has been pulled out of the slot 2 by its owner, the flip-flop 34 is reset by the closing and subsequent opening of the switch contact 5b.

Figure 4B:
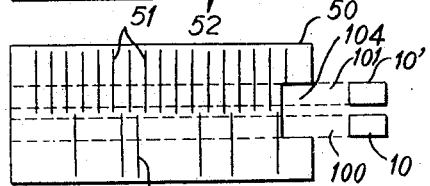

The portion 104 of the one end of the ticket that has been cut by the cutter must include that part of the length of at least one of the synchronizing bars 51 which lies in the area 101 to be scanned by the head 10′, as shown in FIG. 4b. In FIG. 4b the corresponding part of the area 100 is also shown cut. Without the removed portion, the area 101 on the ticket no longer has the number of synchronizing bars required to enable reading the information code bars 52 so that the ticket can no longer be recognized as valid.

Figure 4C:
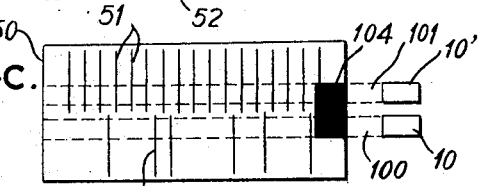
Figure 4D:
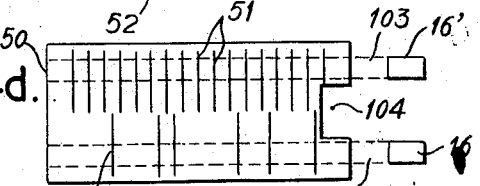

Instead of the cutting of part of the ticket to disturb the original arrangement of the bars 51 and 52, the same portion 104 of the ticket may be painted with any suitable material, as shown in FIG. 4c, to obtain the same result.

If the gate is to be used as an exit gate, the cutter 12 and its associated mechanisms and control elements are replaced by a receptacle for storing the tickets therein so as not to be returned to their owners, and the reading heads may be positioned, as shown at 16 and 16′ in FIG. 4d, so that they may scan those uncut areas 102 and 103 of the ticket which lie alongside the areas 100 and 101 to be scanned by the heads 10 and 10′, respectively, at an entrance gate, and in which the original arrangement of the bars 51 and 52 are maintained.

Figure 4E:
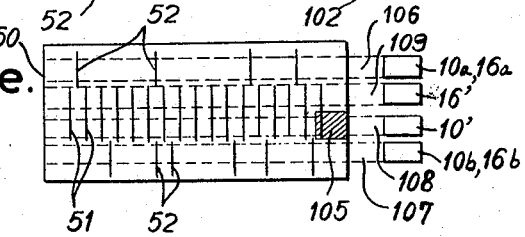

In FIG. 4e the ticket has synchronizing bars 51 recorded along the center line thereof and information code bars 52 along the opposite marginal areas 106 and 107 of the ticket. In this case, the ticket gate for entrance is provided with a pair of reading heads 10a and 10b arranged to face the areas 106 and 107, respectively, and a third head 10′ arranged to face an area 108 of the ticket; and the ticket gate for exit is also provided with a pair of reading heads 16a and 16b arranged to face the areas 106 and 107 of the ticket, respectively, and a third head 16′ arranged to face an area 109 alongside the area 108. The portion 105 that is cut from the ticket lies in the area 108 as shown sketched in FIG. 4e.

The portion 104 or 105 to be cut from the ticket for the purpose of the invention need not always lie in the edge of the ticket but anywhere else therein provided that such cutting results in disturbance or change in the original arrangement of the marks on the ticket. Some or all of the bars may be erased by means of demagnetization or stamping along the areas 100 and/or 101 or 108, or one or more bars may be added by magnetization or punching.

There may be provided on the ticket a specific area to be scanned when the ticket is used for exit for a stopover.

Having illustrated and described preferred embodiments of the invention, it is understood that there are many changes and modifications thereof within the scope of the invention as defined in the appended claims. It is also understood that the expression "the gate for exit" or the like used in the specification and claims means the gate through which passengers pass for exit at a destination or for stop-over.

What I claim is:

1. In a transportation system having a plurality of stations, the combination comprising:
   (1) an entrance gate and an exit gate at each station;
   (2) a ticket for operating said gates, including indicia signifying validity and transportation information;
   (3) each gate having a ticket receiving slot and control means adapted to respond to insertion of a ticket into said slot, said control means including:
(a) indicia reading means responsive to said ticket indicia,
(b) means coupled to said indicia reading means for storing valid ticket information and comparing said indicia therewith,
(c) rejection means responsive to a comparison showing said ticket to be invalid, and
(d) acceptance means responsive to a comparison showing said ticket to be valid;
(4) each entrance gate control means further including ticket indicia altering means for adding to a first portion of said indicia, indicia further signifying that the ticket has been used in an entrance gate, without affecting a second portion of said indicia, said added indicia being positioned relative to the entrance gate indicia reading means to result in a comparison showing the ticket to be invalid upon re-insertion in an entrance gate; and
(5) the exit gate control means further including indicia reading means positioned relative to the ticket receiving slot to read said indicia in the unaltered second portion thereof.

2. The combination defined in claim 1 wherein:
(1) said entrance and exit gate control means further include means for moving said ticket along a predetermined path upon insertion thereof into said slot,
(2) said indicia being arranged in rows parallel to the path of travel, each indicia including parts spaced transversely of the path and located in said first and second portions of said indicia, respectively,
(3) said entrance gate ticket indicia reading means being aligned with the indicia altering means in a direction parallel to said path, and
(4) said exit gate indicia reading means being positioned out of alignment with respect to the altered first portion of said indicia and in alignment with said unaltered second portion, in a direction parallel to said path.

3. The combination defined in claim 2 wherein said ticket includes a row of synchronizing indicia and a row of information indicia, and said indicia reading means includes first and second reading heads positioned for sequential reading of the indicia in said rows, respectively.

4. The combination defined in claim 3 wherein said ticket indicia altering means comprises means for altering a portion of the row of synchronizing indicia.

5. The combination defined in claim 3 wherein said ticket indicia altering means comprises means for altering a portion of the row of information indicia.

6. The combination defined in claim 3 wherein said ticket indicia altering means includes means for removing a section of said first portion of one of said rows of indicia.

7. The combination defined in claim 3 wherein said ticket indicia altering means includes means for adding an indicia to a first portion of one of said rows.

8. The combination defined in claim 7 wherein said indicia adding means comprises means for superimposing indicia upon said portion of the original indicia to prevent reading thereof as valid.

9. The combination defined in claim 3 wherein said indicia comprise magnetized areas of said ticket, said indicia reading means comprise means for detecting said magnetized areas and said indicia altering means comprises means for erasing the magnetization in predetermined ones of said areas.

10. The combination defined in claim 3 wherein:
(1) said ticket includes a second row of information indicia parallel to the path of travel of said ticket,
(2) each entrance and exit gate control means includes a third reading head aligned with said second row of information indicia,
(3) said indicia altering means is aligned with a first portion of said synchronizing indicia, and
(4) the first reading head of said exit gate control means is aligned with a second portion of said synchronizing indicia.

References Cited
UNITED STATES PATENTS

| | | | |
|---|---|---|---|
| 2,659,470 | 11/1953 | DuPont | 194—4 |
| 3,087,018 | 4/1963 | Pferd. | |
| 3,097,347 | 7/1963 | Simjian | 194—4 X |
| 3,165,187 | 1/1965 | Smith | 194—4 |
| 3,204,741 | 9/1965 | Maxwell et al. | 194—4 |
| 3,212,615 | 10/1965 | Hellar | 194—4 |
| 3,282,388 | 11/1966 | Lester et al. | 194—4 |
| 3,312,372 | 4/1967 | Cooper. | |
| 3,338,365 | 8/1967 | Hoffberger et al. | 194—4 |
| 3,339,693 | 9/1967 | Mueller | 194—4 |
| 3,379,295 | 4/1968 | Verley | 194—4 |

SAMUEL F. COLEMAN, Primary Examiner